(12) United States Patent
Sherman et al.

(10) Patent No.: US 7,552,245 B2
(45) Date of Patent: Jun. 23, 2009

(54) COMMUNICATION CARD WITH THREE OPERATIONAL STATES

(75) Inventors: Itay Sherman, Hod Hasharon (IL); Itay Cohen, Raanana (IL); Yaron Segalov, Tel Aviv (IL)

(73) Assignee: MoDu Ltd., Kfar Saba (IL)

( * ) Notice: Subject to any disclaimer, the term of this patent is extended or adjusted under 35 U.S.C. 154(b) by 91 days.

(21) Appl. No.: 11/827,604

(22) Filed: Jul. 11, 2007

(65) Prior Publication Data
US 2008/0307142 A1 Dec. 11, 2008

Related U.S. Application Data

(60) Provisional application No. 60/933,793, filed on Jun. 8, 2007.

(51) Int. Cl.
*G06F 3/00* (2006.01)
*G06F 13/00* (2006.01)

(52) U.S. Cl. .................. 710/15; 710/62; 710/300

(58) Field of Classification Search ............. 710/15–19, 710/62–64, 72–74, 300, 104
See application file for complete search history.

(56) References Cited

U.S. PATENT DOCUMENTS

| 5,628,055 | A | 5/1997 | Stein |
| 6,201,867 | B1 | 3/2001 | Koike |
| 6,243,578 | B1 | 6/2001 | Koike |
| 6,690,947 | B1 | 2/2004 | Tom |
| 6,898,283 | B2 | 5/2005 | Wycherley et al. |
| 7,085,542 | B2 | 8/2006 | Dietrich et al. |
| 7,194,285 | B2 | 3/2007 | Tom |
| 2002/0151327 | A1* | 10/2002 | Levitt .................. 455/556 |
| 2004/0233930 | A1 | 11/2004 | Colby, Jr. |
| 2004/0268005 | A1* | 12/2004 | Dickie ................. 710/303 |
| 2005/0070225 | A1 | 3/2005 | Lee |
| 2005/0159184 | A1 | 7/2005 | Kerner et al. |
| 2006/0003804 | A1* | 1/2006 | Liu ...................... 455/557 |
| 2006/0105722 | A1 | 5/2006 | Kumar |
| 2006/0241353 | A1 | 10/2006 | Makino et al. |
| 2007/0004450 | A1 | 1/2007 | Parikh |
| 2007/0018957 | A1 | 1/2007 | Seo |
| 2007/0079030 | A1* | 4/2007 | Okuley et al. ........... 710/62 |
| 2007/0161404 | A1 | 7/2007 | Yasujima et al. |
| 2007/0288583 | A1* | 12/2007 | Rensin et al. .......... 709/207 |
| 2008/0009325 | A1* | 1/2008 | Zinn et al. ............. 455/566 |
| 2008/0040354 | A1* | 2/2008 | Ray et al. .............. 707/10 |
| 2008/0140886 | A1 | 6/2008 | Izutsu |

FOREIGN PATENT DOCUMENTS

| EP | 1871075 A1 | 12/2007 |
| WO | 0059247 A1 | 10/2000 |
| WO | 0186922 A1 | 11/2001 |
| WO | 03103174 A1 | 12/2003 |

* cited by examiner

*Primary Examiner*—Christopher B Shin
(74) *Attorney, Agent, or Firm*—Soquel Group LLC

(57) ABSTRACT

A communication card with three operational states, including a controller, a battery, a flash storage unit, a wireless modem, and a connector for connecting the communication card to a shell host and to an electronic device host, wherein the communication card (i) operates in a standalone mode when the connector is not connected to a device, (ii) functions as a master when the connector is connected to the shell host, and (iii) functions as a slave when the connector is connected to the electronic device host. A method and a computer-readable storage medium are also described and claimed.

20 Claims, 2 Drawing Sheets

COMMUNICATION CARD WITH THREE OPERATIONAL STATES

PRIORITY REFERENCE TO RELATED APPLICATIONS

This application claims benefit of U.S. Provisional Application No. 60/933,793, entitled COMMUNICATION CARD WITH THREE OPERATIONAL STATES, filed on Jun. 8, 2007 by inventors Itay Sherman, Itay Cohen and Yaron Segalov.

FIELD OF THE INVENTION

The present invention relates to communication cards that may be connected to electronic devices and to shells, and that may also operate in a standalone mode.

BACKGROUND OF THE INVENTION

Prior art communication cards include cards with connectors that enable them to interface with different types of electronic devices that serve as hosts. These cards generally include a radio modem, a CPU with ancillary memories, a power source and possibly data storage.

SUMMARY OF THE DESCRIPTION

The present invention provides a novel communication card (i) that may operate in a standalone mode, (ii) that may be connected to a shell that is not an independent device and that cannot operate without the communication card being connected thereto, and (iii) that may be connected to an electronic device that serves as the card's host. In state (ii) the communication card functions as a master, and in state (iii) the communication card functions as a slave.

There is thus provided in accordance with an embodiment of the present invention a communication card with three operational states, including a controller, a battery, a flash storage unit, a wireless modem, and a connector for connecting the communication card to a shell host and to an electronic device host, wherein the communication card (i) operates in a standalone mode when the connector is not connected to a device, (ii) functions as a master when the connector is connected to the shell host, and (iii) functions as a slave when the connector is connected to the electronic device host.

There is additionally provided in accordance with an embodiment of the present invention a method for determining the operational state of a communication card, including providing a communication card that has three operational states, namely, (i) the communication card in a standalone mode (State I), (ii) the communication card connected to a shell (State II), and (iii) the communication card connected to a host (State III), monitoring a first signal on the communication card, and if the first signal has a voltage level lower than a first designated threshold, then concluding that the communication card is in State I, otherwise, concluding that the communication card is connected to a device, and monitoring a second signal on the communication card, and if the second signal has a voltage level lower than a second designated threshold, then concluding that the communication card is in State II, otherwise, concluding that the communication card is in State III.

There is moreover provided in accordance with an embodiment of the present invention a computer readable storage medium storing program code for causing a computing device to determine the state of a communication card that has three operational states, namely, (i) the communication card in a standalone mode (State I), (ii) the communication card connected to a shell (State II), and (iii) the communication card connected to a host (State III), by monitoring a first signal on the communication card, and if the first signal has a voltage level lower than a designated threshold, then concluding that the communication card is in State I, otherwise, concluding that the communication card is connected to a device, and monitoring a second signal on the communication card, and if the second signal has a voltage level lower than the designated threshold, then concluding that the communication card is in State II, otherwise, concluding that the communication card is in State III.

There is further provided in accordance with an embodiment of the present invention a communication card with three operational states, including a card connector for connecting a communication card to a shell and to an electronic device, including a connector for incoming and outgoing audio signals, a connector for a power supply, a universal serial bus (USB) connector, and a communication bus, wherein (i) no signals are routed to the communication bus when the card operates in a standalone mode (State I), (ii) secure digital (SD) card signals are routed to the communication bus when the card is connected to a shell (State II), with the card functioning as master, and (iii) SD card signals are routed to the communication bus when the card is connected to an electronic device (State III), with the card functioning as a slave, and circuitry for automatically detecting whether the card is operating in State I, State II or State III.

BRIEF DESCRIPTION OF THE DRAWINGS

The present invention will be more fully understood and appreciated from the following detailed description, taken in conjunction with the drawings in which.

DETAILED DESCRIPTION

The present invention relates to a communication card that is operable in three states; namely, (I) a standalone state, (II) a state connected to a simple host, and (III) a state connected to a complex host. In State II the simple host is a shell. The communication card operates as a master and the shell operates as a slave. Conversely, in State III the complex host is a consumer electronics (CE) device. The communication card operates as a slave and the CE device operates as a master.

In State I as a standalone, the card has its own user interface and provides communication data and voice over radio technology, in addition to other services including inter alia MP3 playing.

In State II connected to a simple host, the shell is not an independent device and cannot operate without the communication card being connected thereto. The shell may include only a display, a keyboard and a simple non-volatile EEPROM storage chip. Optionally, the shell may further include speakers, a microphone and a secondary power source. The communication card supplies power to the shell's keyboard, display speakers and microphone, and to the card's own internal circuitry. The communication card uses the shell's secondary power source to charge the card's internal power source.

In State III connected to a complex host, the CE device is an independent device that operates independently of the communication card, such as an MP3/MPP player or a digital camera. Commands and information are shared, and sent over an SD control bus during operation. The CE device includes its own CPU, user interface and power source. The user interface for both the device functionality and the communication card functionality operates through the CE device. The interface to the CE device is via the communication card connector, where pins on the connector have specifically assigned functionalities and use specific protocols.

It will thus be appreciated by those skilled in the art that the interface to the shell is via the same communication card connector as is the interface to the CE device, but the pins on the connector generally have different functionalities and use different protocols with the shell than those used with the CE device.

The three operational states of the communication card are summarized in TABLE I hereinbelow.

TABLE I

Three Operation States of a Communication Card

| | | |
|---|---|---|
| State I | Standalone | Card uses its own interface |
| State II | Connected to a simple host | Card is master; Shell is slave<br>Shell cannot operate without card<br>Card provides shell with screen shots, in the form of bitmap images, for display information<br>Communication is through SD bus |
| State III | Connected to a complex host | Card is slave; CE device is master<br>CE device operates independently of card<br>Card provides CE device with screen shots, in the form of bitmap images, for display information<br>Communication is through SD bus |

Figure 1:
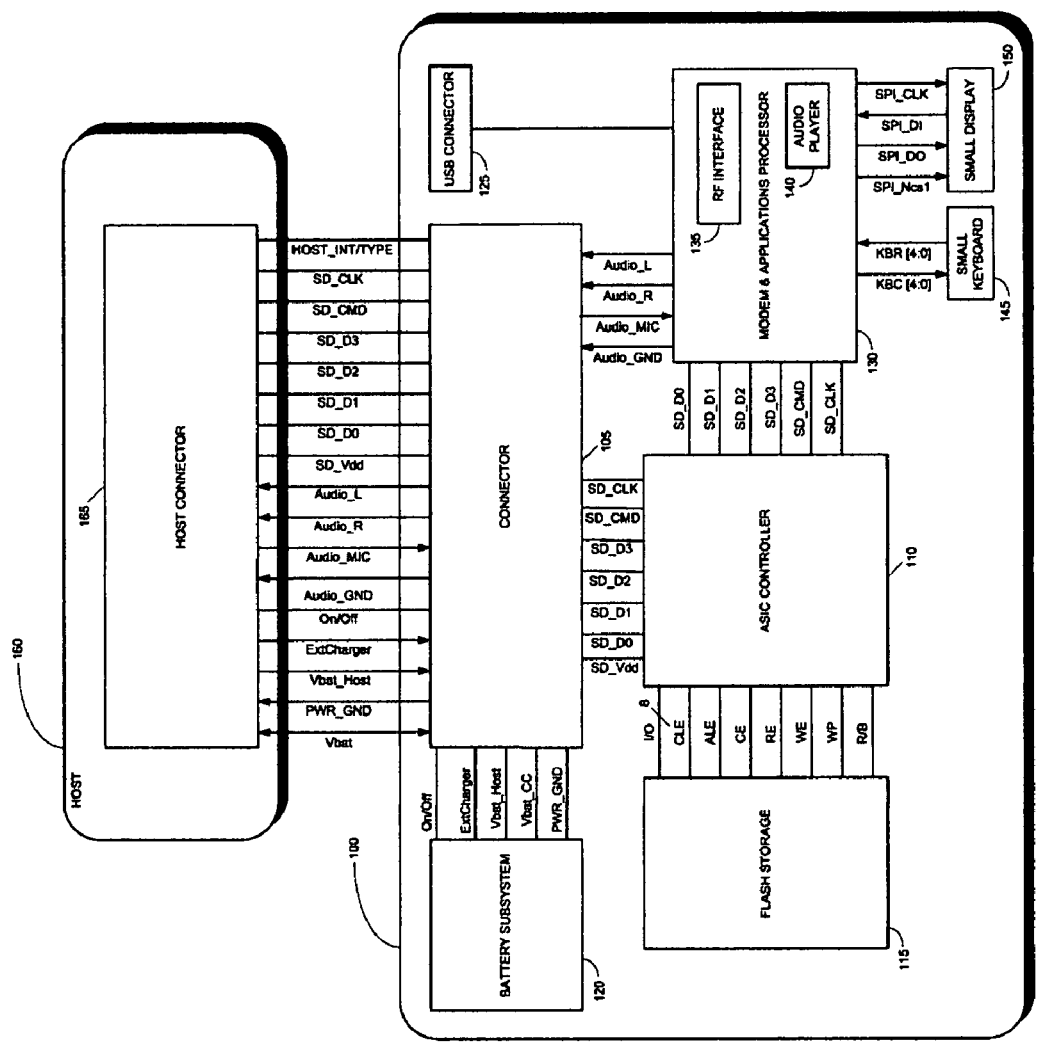
FIG. 1 is a simplified block diagram of a communication card with three operational states, in accordance with a first embodiment of the present invention.

Reference is now made to FIG. 1, which is a simplified block diagram of a communication card with three operational states, in accordance with a first embodiment of the present invention. As shown in FIG. 1, a communication card 100 includes a connector 105, a controller 110, a flash storage unit 115, a battery subsystem 120, a USB connector 125 and a modem & applications processor 130. Modem 130 includes a radio frequency (RE) interface 135 and an audio player 140. Modem 130 is coupled with an input device 145, which is a small keyboard, and an output device 150, which is a small display.

Also shown in FIG. 1 is a host device 160 with a host connector 165 that may be connected to the communication card connector 105. In accordance with an embodiment of the present invention, device 160 may be a shell and may be a CE device.

It will be appreciated by those skilled in the art that communication card 100 supports the three operational states in TABLE I. Components 105-150 enable communication card 100 to function as a standalone device. When host 160 is connected to communication card 100, communication card 100 may operate as a master or as a slave, and the SD communication between connectors 105 and 165 flows accordingly. Specifically, in State II communication card 100 is the master and host 160 is the slave, and in State III communication card 100 is the slave and host 160 is the master.

In accordance with an embodiment of the present invention communication card 100 automatically detects its operational environment by monitoring the voltage on designated pins on the connector. I.e., communication card 100 distinguishes between States I-III based on voltage. CE devices and shells generally drive the voltage on these pins differently, which enables communication card 100 to discriminate whether or not it is connected to device 160, and to detect the type of device 160 it is connected to.

Figure 2:
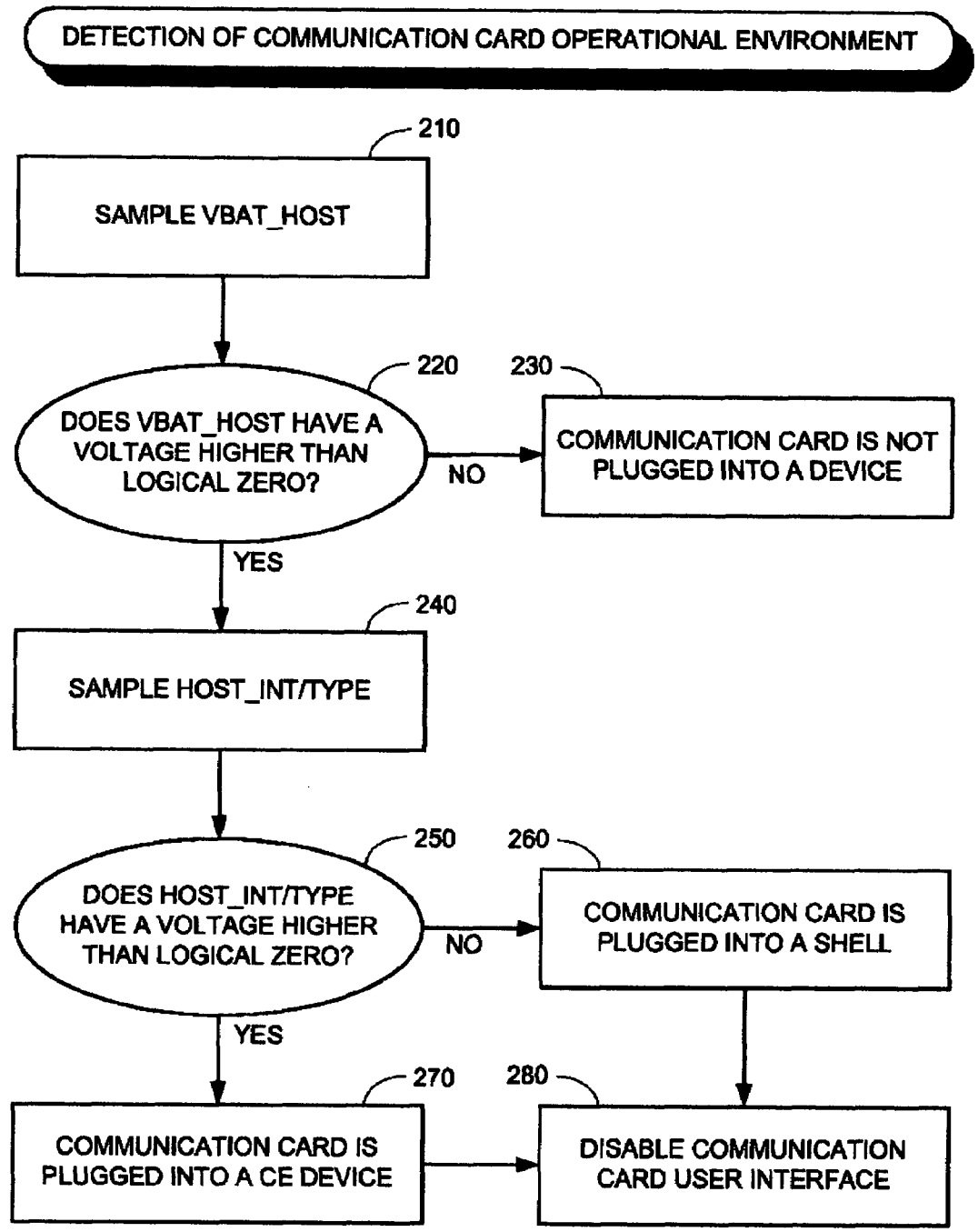
FIG. 2 is a simplified flowchart of a method for a communication card to detect the type of device it is connected to, in accordance with an embodiment of the present invention.

In this regard, reference is made to FIG. 2, which is a simplified flowchart of a method for communication card 100 to detect the type of host 160 it is connected to, in accordance with an embodiment of the present invention. At step 210 controller 105 monitors the connector signal VBat_host, shown in FIG. 1. If the VBat_host signal has a voltage level higher than logical zero (i.e., 0.5V or higher), as determined at step 220, then controller 105 concludes that communication card 100 is connected to host 160. Otherwise, if VBat_host is logical zero (i.e., below 0.5V), then at step 230 controller 105 concludes that communication card 100 is not connected to a host. As such, it will be appreciated by those skilled in the art that when host 160 is attached to communication card 100, controller 105 detects this by monitoring VBat_host.

In order to detect which type of host 160 is connected to communication card 100, controller 105 monitors the HOST_INT/TYPE signal, shown in FIG. 1. When connection to a host is detected, the HOSTANT/TYPE signal is sampled at step 240. If HOST_INT/TYPE is a logical zero (i.e., below 0.5V), as determined at step 250, then at step 260 the controller concludes that host 160 is a simple shell. Otherwise, if HOST_INT/TYPE is higher than logical zero (i.e., 0.5V or higher), then at step 270 the controller concludes that host 160 is a CE device.

The functionality of HOST_INT/TYPE for detecting the type of host 160, is used wheft at the time host 160 is attached to communication card 100. Afterwards, the signal HOST_INT/TYPE is used as an interrupt signal.

In an alternative embodiment of the present invention, the SD_Vdd signal, shown in FIG. 1, may be monitored at step 210 instead of or in addition to the VBat_host signal. Whereas the VBat_host signal generally indicates whether or not communication card 100 is connected to host 160, the SD_Vdd signal generally indicates whether or not host 160 is turned on.

It will be appreciated by those skilled in the art that the threshold of 0.5V used in the above discussion is merely indicative of a general pre-designated threshold that is used to detect attachment of the host to the communication card, and to detect the type of the host.

When communication card controller 105 detects connection to a CE device or a shell, the internal user interface of communication card 100 is disabled at step 280. For CE devices, communication card controller 105 receives user interface inputs, and provides feedback as bitmap graphics BMP screen shots, or as single messages, via the secure digital (SD) card bus. The CE device controls the device's display and keyboard. For shell devices, the communication card controller receives direct keyboard strokes on the shell keyboard over an SD bus, and provides the displayed image pixels/characters directly to the shell display over the SD bus.

In an embodiment of the present invention, in order to be powered, shells connect their internal circuitry to the Vbat_CC signal that connects to connector 105. If a shell 160 has a secondary battery, then the secondary battery is connected to Vbat_Host, which connects to communication card's battery subsystem 120 and is used to charge the communication card's internal battery.

Similarly, the internal circuitry of a CE device 160 is powered by connecting its internal power source to Vbat_Host. CE device 160 does not use the Vbat_CC signal as a power source, but may monitor it to detect when communication card 100 is connected thereto, or to monitor the communication card's battery level.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication card with three operational states, comprising:
    a controller;
    a flash storage unit, coupled with said controller, for storing data used by said controller;
    a wireless modem, coupled with said controller, for transmitting and receiving data over a wireless network in response to instructions received from said controller;
    a battery, coupled with said controller, with said flash storage unit and with said wireless modem, for supplying power to said controller, to said flash storage unit, and to said wireless modem; and
    a connector, coupled with said controller, for connecting the communication card to a shell host and to a device host; wherein the communication card (i) operates in a standalone mode when said connector is not connected to a host, (ii) functions as a master when said connector is connected to the shell host, providing display information to the shell host in the form of screen shots, and (iii) functions as a slave when said connector is connected to the device host, enabling the device host to operate the communication card.

2. The communication card of claim 1 further comprising circuitry for determining whether said connector is connected to a host and, if so, whether the host is the shell host or the device host.

3. The communication card of claim 1 wherein said battery is used to power the shell host when the shell host is connected thereto.

4. The communication card of claim 1 wherein the shell host has its own battery, and wherein said battery is charged by the shell host's battery when the shell host is connected to said connector.

5. The communication card of claim 1 further comprising a USB connector coupled with said controller.

6. The communication card of claim 1 wherein said wireless modem comprises an audio player.

7. A method for determining the operational state of a communication card, comprising:
    providing a communication card that has three operational states, namely, (i) the communication card in a standalone mode (State I), (ii) the communication card connected to a shell host (State II), and (iii) the communication card connected to a device host (State III);
    monitoring a first signal on the communication card; and
    if the first signal has a voltage level lower than a first designated threshold, then concluding that the communication card is in State I;
    otherwise, concluding that the communication card is connected to a host, and:
        monitoring a second signal on the communication card; and
        if the second signal has a voltage level lower than a second designated threshold, then concluding that the communication card is in State II and controlling the communication card to operate as a master for the shell host;
    otherwise,
        concluding that the communication card is in State III and controlling the communication card to onerate as a slave for the device host.

8. The method of claim 7 wherein the first signal is a battery voltage.

9. The method of claim 8 wherein the first designated threshold is 0.5V.

10. The method of claim 7 wherein the second signal is a battery voltage.

11. The method of claim 10 wherein the second designated threshold is 0.5V.

12. A computer readable storage medium storing program code for causing a computing device to determine the state of a communication card that has three operational states, namely, (i) the communication card in a standalone mode (State I), (ii) the communication card connected to a shell host (State II), and (iii) the communication card connected to a device host (State III), by:
    monitoring a first signal on the communication card; and
    if the first signal has a voltage level lower than a designated threshold, then concluding that the communication card is in State I;
    otherwise, concluding that the communication card is connected to a host, and:
        monitoring a second signal on the communication card; and
        if the second signal has a voltage level lower than the designated threshold, then concluding that the communication card is in State II and controlling the communication card to onerate as a master for the shell host;
    otherwise,
        concluding that the communication card is in State III and controlling the communication card to onerate as a slave for the device host.

13. A communication card with three operational states, comprising:
    a card connector for connecting a communication card to a shell host and to a device host, comprising a plurality of pins, the pins comprising:
        a connector for incoming and outgoing audio signals;
        a connector for a power supply; and
        a universal serial bus (USB) connector;
    a communication bus, wherein (i) no signals are routed to the communication bus when the card operates in a standalone mode (State I), (ii) secure digital (SD) card signals are routed to the communication bus when the card is connected to the shell host (State II) using a set of functionalities assigned to said connector nins, with the card functioning as master, and (iii) SD card signals are routed to the communication bus when the card is connected to the device host (State III) using a different set of functionalities assigned to said connector pins, with the card functioning as slave; and
    circuitry for automatically detecting whether the card is operating in State I, State II or State III.

14. The communication card of claim 13 wherein said circuitry senses voltages across said connector pins.

15. The communication card of claim 13 wherein said different set of functionalities comprises SD communication functionalities.

16. The communication card of claim 13 wherein said shell host provides a user interface for the communication card.

17. The communication card of claim 16 wherein the shell user interface comprises at least one speaker.

18. The communication card of claim 16 wherein the shell user interface comprises a microphone.

19. The communication card of claim 13 wherein said device host is a media player.

20. The communication card of claim 13 wherein said device host is a digital camera.

* * * * *